(12) United States Patent
Bekal Kannangola et al.

(10) Patent No.: US 12,505,827 B1
(45) Date of Patent: Dec. 23, 2025

(54) CUSTOMIZABLE LATENCY FOR AUTOMATIC SPEECH RECOGNITION

(71) Applicant: Amazon Technologies, Inc., Seattle, WA (US)

(72) Inventors: Dhanush Bekal Kannangola, Seattle, WA (US); Goeric Sydney Huybrechts, San Francisco, CA (US); Xilai Li, Redmond, WA (US); Srikanth Ronanki, San Jose, CA (US); Srikanth Vishnubhotla, Santa Clara, CA (US); Hadis Nosrati, Queens Park (AU); Vivek Govindan, Black Diamond, WA (US); Jeffrey John Farris, Crystal Lake, IL (US); Sravan Babu Bodapati, Fremont, CA (US); Katrin Kirchhoff, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 289 days.

(21) Appl. No.: 18/129,463

(22) Filed: Mar. 31, 2023

(51) Int. Cl.
| | |
|---|---|
| *G10L 15/06* | (2013.01) |
| *G10L 15/04* | (2013.01) |
| *G10L 15/16* | (2006.01) |
| *G10L 15/22* | (2006.01) |

(52) U.S. Cl.
CPC ............ *G10L 15/063* (2013.01); *G10L 15/04* (2013.01); *G10L 15/16* (2013.01); *G10L 15/22* (2013.01)

(58) Field of Classification Search
CPC ....... G10L 15/063; G10L 15/04; G10L 15/16; G10L 15/22
See application file for complete search history.

(56) References Cited

U.S. PATENT DOCUMENTS

| | | | | |
|---|---|---|---|---|
| 2017/0103752 | A1* | 4/2017 | Senior | G10L 15/16 |
| 2018/0308487 | A1* | 10/2018 | Goel | G10L 15/1815 |
| 2022/0310097 | A1* | 9/2022 | Kim | G10L 15/16 |
| 2023/0326461 | A1* | 10/2023 | Ding | G10L 15/16 |
| | | | | 704/270.1 |
| 2023/0368779 | A1* | 11/2023 | Tripathi | G06N 3/04 |
| 2024/0371379 | A1* | 11/2024 | Kim | G10L 15/063 |
| 2025/0022458 | A1* | 1/2025 | Audhkhasi | G06N 3/04 |

OTHER PUBLICATIONS

Anmol Gulati et al., Conformer: Convolution-augmented Transformer for Speech Recognition, May 16, 2020, 1-5.
Daniel S. Park et al., SpecAugment: A Simple Data Augmentation Method for Automatic Speech Recognition, Dec. 3, 2019, 1-6.
Linhao Dong et al., Self-Attention Aligner: A Latency-Control End-to-End Model for ASR Using Self-Attention Network and Chunk-Hopping, Feb. 18, 2019, 1-5.
Suyoun Kim et al., Joint CTC-Attention Based End-to-End Speech Recognition Using Multi-Task Learning, Jan. 31, 2017, 1-5.

* cited by examiner

*Primary Examiner* — Mohammad K Islam
(74) *Attorney, Agent, or Firm* — Nicholson De Vos Webster & Elliott LLP

(57) ABSTRACT

Techniques for customizable latency, from the customer's side, for automatic speech recognition (ASR) are described. In particular, the customer may specify a parameter that controls how fast or how slow the customer's media content will be streamed or processed. Slower processing means higher accuracy, with near real-time latency, while faster processing means lower accuracy, but offers much lower latency (e.g., less than 600 ms). Enabling tuning of the latency-versus-accuracy tradeoff of the ASR system offers customers the flexibility to meet varying needs for different ASR applications.

20 Claims, 10 Drawing Sheets

FIG. 5A CONVENTIONAL CONVOLUTION

FIG. 5B CAUSAL CONVOLUTION

FIG. 5C CHUNK CONVOLUTION

CUSTOMIZABLE LATENCY FOR AUTOMATIC SPEECH RECOGNITION

BACKGROUND

Speech recognition, also known as automatic speech recognition (ASR), computer speech recognition, or speech-to-text, is a capability that enables a computer program to process human speech into a written format. Many speech recognition applications and devices are available, but the more advanced solutions use artificial intelligence (AI) and machine learning (ML). They integrate grammar, syntax, structure, and composition of audio and voice signals to understand and process human speech.

BRIEF DESCRIPTION OF DRAWINGS

Various examples in accordance with the present disclosure will be described with reference to the drawings, in which.

DETAILED DESCRIPTION

Figure 1:
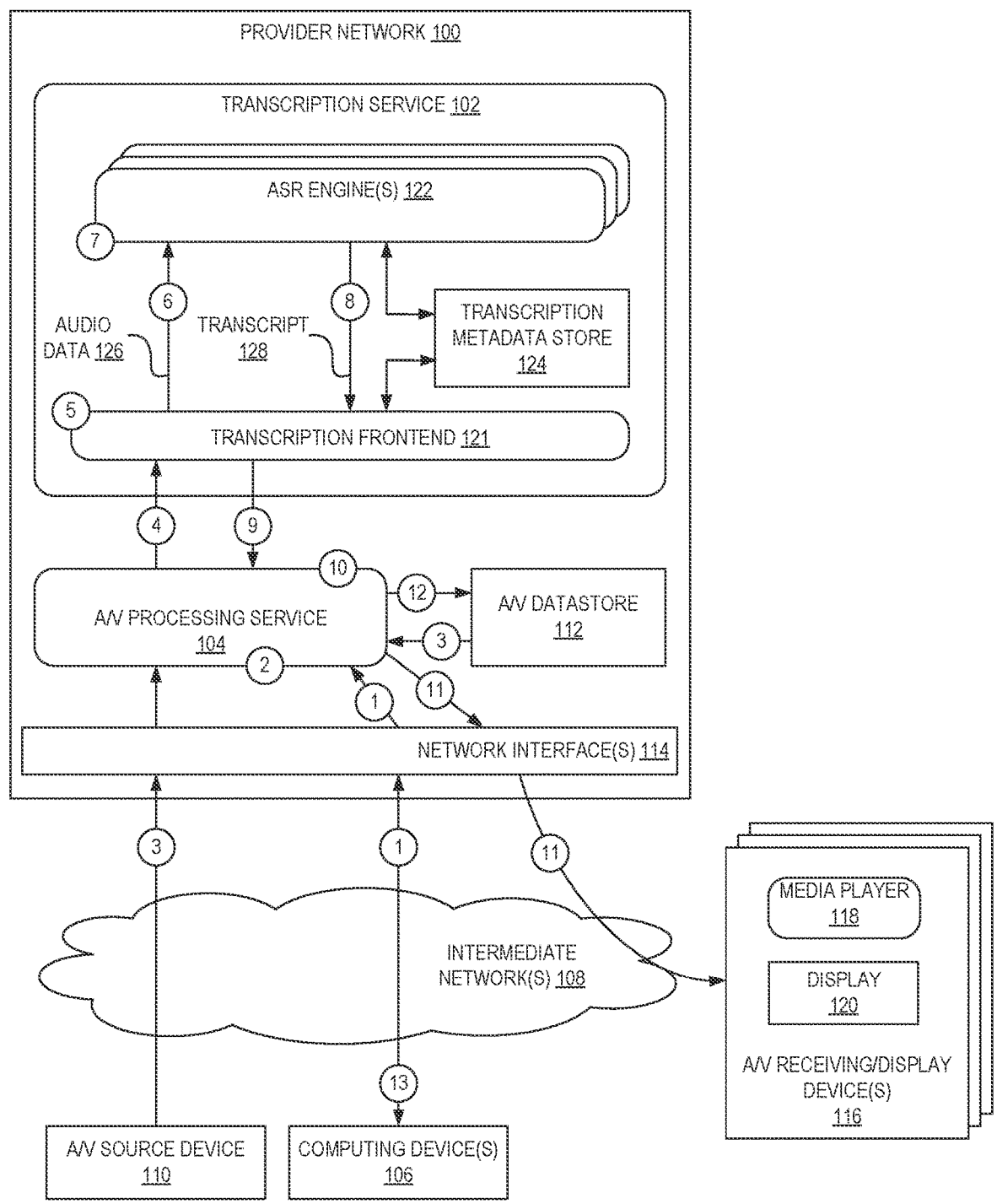
FIG. 1 is a functional block diagram illustrating an environment for customizable latency for automatic speech recognition (ASR) according to some examples.

The present disclosure relates to customizable latency for automatic speech recognition (ASR). Streaming transcription services produce real-time transcriptions for streaming media content. Unlike batch transcriptions, which generally involve uploading complete media files for complete transcription, streaming media is delivered to a streaming transcription service in real time, prior to completion of the streaming media. The transcription service then returns a transcript, also in real time. Streaming can include pre-recorded media (e.g., movies, music, podcasts) and real-time media (e.g., live news broadcasts). Common streaming transcription service use cases include live closed captioning for sporting events and real-time monitoring of call center audio. As used herein, real time is a relative term, and can be defined according to the requirements of the embodiment. For example, real time may imply a deadline that is generally set such that there is little or no perceptible delay.

Some existing streaming APIs (application programming interfaces) offer real-time processing of audio, but at the cost of decreased recognition performance (e.g., measured in word error rate (WER)), when compared to offline batch processing. In a batch scenario, because full audio is available, a network can look forward at audio after a current point in time to help determine the text spoken at the current point in time. In a streaming scenario, looking forward at audio after a current point in time adds latency to the transcription generation process, which is undesirable. Conventional approaches may thus optimize the network architecture for streaming by using limited context to improve latency, with some degradation in performance. That is, conventional approaches to transcription might identify speech based solely on current or past context, because the transcription needs to be delivered immediately, and the process therefore can't wait to hear what comes later. For example, some current streaming models offer latency of less than 1 second, but with more than 30% relative reduction in performance (measured in WER).

Although sub-second streaming latency can be beneficial, it is not a necessary requirement for all use cases, as different use cases for streaming ASR have different latency requirements and different requirements for transcription quality. A technical problem thus arises where a given use case has requirements for latency and transcription quality that cannot be met by existing transcription services. Some embodiments of the present disclosure solve this technical problem by providing streaming ASR with a customizable latency that also impacts expected output quality. In particular, a customer or other entity may specify a parameter that controls how fast or how slow media content will be streamed or processed. Slower processing can mean higher accuracy and with a WER that more closely aligns with offline processing, which may be beneficial for streaming pre-recorded audio, but with higher latency. Faster processing can mean relatively lower performance, but can offer lower latency (e.g., less than 600 ms). Enabling tuning of the latency-versus-accuracy tradeoff of the ASR system offers flexibility to meet varying needs for different ASR applications.

Some of the present embodiments relate to self-attention. A self-attention mechanism receives n inputs and returns n outputs. The self-attention mechanism allows the inputs to interact with each other (hence the self label) and find out who they should pay more attention to (hence the attention label). The outputs are aggregates of these interactions and attention scores.

Some of the present embodiments relate to utterances, frames, and chunks. In the context of ASR, an utterance is one or more spoken words, and the utterance is received by the ASR model. The utterance is subdivided into chunks, where each chunk comprises one or more frames, and each frame comprises a portion of the utterance that spans a set amount of time. For example, a frame may include 40 ms of the utterance. In the present embodiments, a frame may have any size, and 40 ms is merely one non-limiting example. A chunk may have any number of frames, and in some embodiments a size of each chunk may vary depending on a selectable latency parameter, as discussed below. In some embodiments, a hop size may relate to a degree of overlap in an overlapping sequence of chunks. For example, where a hop size is 50%, then a next frame in a sequence may begin at the midpoint of a current frame, such that the last half of the current frame overlaps with the first half of the next frame.

In particular, some embodiments solve the above-described technical problem by providing a chunk-based self-attention (CSA) mechanism that first segments the whole utterance into chunks using a hop size of 50%. CSA attends to all frames of a current chunk, as well as to the first half of all previous chunks. At the last encoder layer, to avoid redundancy due to overlap, only frames of the first half of each chunk are forwarded, except for the last chunk of an utterance for which all frames are maintained. The CSA latency is influenced by the chunk size. With a dynamic chunk-based attention strategy, the trained model can be allowed to operate with arbitrary right-context length. In some embodiments, a dynamic chunk size is used for different batches in training, where the dynamic chunk size range is a uniform distribution up to the maximum utterance length. That is, the attention varies from left-context attention to full-context attention, and the model captures different information on various chunk size, and learns how to do accurate prediction when different limited right-contexts are provided. The embodiments described herein provide a technical solution that improves computer-related technology, at least because a customer or other entity may specify a latency parameter that controls how fast or how slow media content will be streamed or processed. Slower processing can mean higher accuracy and with a WER that more closely aligns with offline processing, which may be beneficial for streaming pre-recorded audio, but with higher latency. Faster processing can mean relatively lower performance, but can offer lower latency (e.g., less than 600 ms). Enabling tuning of the latency-versus-accuracy tradeoff of the ASR system offers flexibility to meet varying needs for different ASR applications.

FIG. 1 illustrates an environment for customizable latency for automatic speech recognition (ASR) according to some examples. In the environment illustrated in FIG. 1, a user may specify a value for a parameter that controls the customizable latency for ASR, thereby enabling the user to tune the ASR output to meet the needs of a variety of different use cases. The illustrated environment includes a provider network 100 hosting a transcription service 102 and an A/V (audio/video) processing service 104, among other possible services. One or more computing devices 106 (may also be referred to as client devices, user devices, or electronic devices) interact with the provider network 100 across one or more intermediate networks 108 (e.g., the internet). In some embodiments, the A/V processing service 104 receives audio data and/or video data from an A/V source device 110 that is outside the provider network 100, and the A/V processing service 104 provides at least the audio data to the transcription service 102. In some embodiments, the transcription service 102 receives audio data from another source, such as an A/V datastore 112 that is within the provider network 100.

A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 108 (e.g., the internet) via one or more network interface(s) 114, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The network interface(s) 114 can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy.

Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

With reference to FIG. 1, the A/V source device 110 outside the provider network 100 generates audio data 126 and/or video data (referred to herein as A/V data). In some embodiments, the A/V source device 110 may be a camera, and may generate the A/V data as it records audio and/or images from the area in its vicinity. The A/V source device 110 may include A/V encoding modules (not shown) for encoding the A/V data prior to transmitting the encoded A/V data over the intermediate network(s) 108 to the provider network 100. Alternatively, the A/V source device 110 may be communicatively coupled to an A/V encoding device (not shown), and may transmit the A/V data to the A/V encoding device, which may then encode the A/V data prior to transmitting the encoded A/V data over the intermediate network(s) 108 to the provider network 100. Although only one A/V source device 110 is shown in FIG. 1, in some embodiments multiple A/V source devices 110 may send A/V data to the provider network 100. In alternative embodiments, the A/V source device 110 may be one or more playout devices/systems that play media content and send the media content to the provider network 100. In some embodiments, the A/V source device 110 may be an audio-only (no video) device, and in such embodiments the A/V data may comprise audio only.

The A/V processing service 104 receives the encoded A/V data and decodes the encoded A/V data using one or more decoders (not shown). The A/V processing service 104 subsequently sends the A/V data to the transcription service 102, which transcribes the audio portion of the A/V data, as described in detail below. The A/V data and a transcription of the audio portion of the A/V data are subsequently sent from the transcription service 102, via the network interface(s) 114 and the intermediate network(s) 108, to one or more A/V receiving/display devices 116 outside the provider network 100, and/or to other processing services or storage locations for subsequent use by other applications.

With continued reference to FIG. 1, the A/V receiving/display device 116 includes a media player 118 (e.g., to play media content such as audio and/or video), and a display 120 to show the images of the A/V data (e.g., from video data files). The A/V receiving/display device 116 may further include local memory (not shown) to store the A/V data. For example, the local memory may buffer the A/V data as it is received from the provider network 100. The A/V receiving/display device 116 is one example of the computer system 1000 illustrated in FIG. 10, which is described in detail below.

In one non-limiting example, some of the present embodiments may be implemented using WebRTC (Web Real-Time Communication). WebRTC allows audio and video communication to work inside web pages by allowing direct peer-to-peer communication, eliminating the need to install plugins or download native apps. It supports video, voice, and generic data to be sent between peers, and is available as JavaScript APIs in a variety of web browsers. While WebRTC may be used in some embodiments, other embodiments may use different technologies.

As described above, the environment illustrated in FIG. 1 enables a user to specify a value for a parameter that controls the customizable latency for ASR, thereby enabling the user to tune the ASR output to meet the needs of a variety of different use cases. In various embodiments, the operations of FIG. 1 happen in a streaming manner. Thus, the description below may apply to a particular segment of a data stream, and the interactions may happen multiple times concurrently or consecutively, for example. In the example embodiment illustrated in FIG. 1, the transcription service 102 includes a transcription frontend 121, one or more ASR engines 122, and a transcription metadata store 124. In some embodiments, the transcription frontend 121 receives requests for the transcription service 102 and routes each request to an appropriate one of the ASR engines 122 based on one or more characteristics (e.g., the language) of the request. For example, at circle "1" the computing device 106 may transmit a request, in some embodiments, to the A/V processing service 104, over the intermediate network(s) 108 and via the network interface(s) 114 of the provider network 100. In some embodiments, the request is to begin processing of A/V data generated by the A/V source device 110, or to initiate transmission of A/V data from the A/V source device 110 to the A/V processing service 104. Also in some embodiments, the request is to begin processing of A/V data stored at the A/V datastore 112. The request may specify that a transcript is to be generated for the A/V data, and the request may further specify a desired latency for the transcription processing. For example, the request may specify a value for a tunable latency parameter. As described in further detail below, the tunable latency parameter establishes an amount of forward context available, and thus can increase accuracy of transcription when set to make more forward context available, but at the cost of increased delay for the transcription.

In the example embodiment illustrated in FIG. 1, at circle "2," the A/V processing service 104 (e.g., one or more processor(s) of the A/V processing service 104) receives the request and determines that the request specifies that a transcript is to be generated for the A/V data. At circle "3," in the example embodiment illustrated in FIG. 1, the A/V processing service 104 receives the A/V data from the A/V source device 110, or the A/V processing service 104 retrieves the A/V data from the A/V datastore 112. In the example embodiment illustrated in FIG. 1, at circle "4," the A/V processing service 104 sends the A/V data to the transcription service 102, and also sends a request to the transcription service 102 to generate a transcript for the A/V data. This transcription request includes at least some of the parameters that were specified in the request that was sent from the computing device 106 to the A/V processing service 104 (at circle "1"). In some embodiments, the A/V processing service 104 may send the transcription request to the transcription service 102 concurrently with the A/V data, while in other embodiments the transcription request may be sent to the transcription service 102 before or after the A/V data.

At circle "5," in the example embodiment illustrated in FIG. 1, the transcription frontend 121 receives the transcription request, determines the language of the request, and determines which of the ASR engines 122 to route the request to based on the language of the request. In the example embodiment illustrated in FIG. 1, at circle "6," the transcription frontend 121 forwards the audio data 126 portion of the A/V data to the determined one of the ASR engines 122. At circle "7," in the example embodiment illustrated in FIG. 1, the ASR engine 122 processes the audio data 126 and generates the transcript of the audio data 126 according to the parameters specified in the transcription request, including the latency parameter. In the example embodiment illustrated in FIG. 1, at circle "8," the ASR engine 122 sends the transcript 128 of the audio data 126 to the transcription frontend 121, and the transcription frontend 121 forwards the transcript 128 of the audio data 126 to the A/V processing service 104 at circle "9."

At circle "10," in the example embodiment illustrated in FIG. 1, the A/V processing service 104 combines the transcript 128 of the audio data 126 with the A/V data and sends, at circle "11," the combined transcript and A/V data to the one or more A/V receiving/display devices 116 outside the provider network 100. In the example embodiment illustrated in FIG. 1, the A/V processing service 104 may send the combined transcript and A/V data, at circle "12," to the A/V datastore 112 for storage in addition to, or instead of, sending the combined transcript and A/V data to the A/V receiving/display device(s) 116. In some embodiments, the A/V processing service 104 may send the combined transcript and A/V data, at circle "13," to the computing device 106 in addition to, or instead of, sending the combined transcript and A/V data to the A/V receiving/display device(s) 116, and/or in addition to, or instead of, sending the combined transcript and A/V data to the A/V datastore 112. In such embodiments, the computing device 106 may include a media player (not shown) and a display (not shown), similar to the A/V receiving/display device(s) 116. In some embodiments, the data sent at any (or all, or any subcombination) of circles "10," "11," "12," "13," may comprise only the transcript and not the A/V data.

In some embodiments, the transcription metadata store 124 contains job status information, such as identifiers of jobs submitted by one or more customers, indicators of a current stage for one or more jobs, timestamps for various stages (e.g., beginning, end) for one or more jobs, indicators of where the outputs (e.g., transcriptions) for one or more jobs are stored, etc. The transcription service 102 may use the information stored at the transcription metadata store 124 to track job status and/or to generate one or more performance metrics for the ASR engines 122. The transcription metadata store 124 may also contain information about customer-specific artifacts, such as Custom Vocabulary (CV) and Custom Language Models (CLM) used by the ASR engines 122 for processing audio.

As described above, in some embodiments the transcription latency is a tunable parameter. For example, a user of the computing device 106 may specify, in some embodiments, a value for the latency parameter when initiating the request at circle "1" in FIG. 1. The code below illustrates one example of how such a parameter may be specified within an hypertext markup language (HTML) request. In particular, the last line of code sets the value for the latency parameter as follows: x-transcribe-streaming-latency: 0.5. The user may set this value using, for example, a graphical user interface (GUI), a command line interface (CLI), or via any other suitable interface. In some embodiments, the latency parameter may be set at any one of a range of preset values (e.g., [0.25, 0.5, 1, 2, 3, 4]), while in other embodiments the latency parameter may be set to any specified value, such as any value input by a customer. For the latency parameter, which may be a unitless parameter, in some embodiments a lower number indicates lower latency and less transcription accuracy, while a higher number indicates higher latency and greater transcription accuracy. In other embodiments, a lower number for the latency parameter may indicate a higher latency and greater transcription accuracy, while a higher number for the latency parameter may indicate a lower latency and less transcription accuracy. In some embodiments, a default value for the latency parameter may be set to 1.

```
transfer-encoding: chunked
POST /stream-transcription HTTP/2
host: speechToText.us-west-2.example.com
X-Target: com.example.speechToText.StartStreamTranscription
Content-Type: application/vnd.example.eventstream
X-Content-Sha256: string
X-Date: YYYYMMDDTHHMMSSZ
Authorization: HMAC-SHA256 Credential=access-key/YYYYMMDD/us-west-2/speechToText/a
x-speechToText-language-code: en-US
x-speechToText-media-encoding: flac
x-speechToText-sample-rate: 16000
x-speechToText-streaming-latency: 0.5
```

As described above, the CSA latency is influenced by the chunk size, and in some embodiments the latency parameter and the chunk size are directly related. Thus, when the tunable latency parameter is adjusted downward (lesser value for the latency parameter for lower latency and less accuracy), in some embodiments the chunk size may be decreased (smaller chunk size) in order to provide lower latency. Similarly, when the tunable latency parameter is adjusted upward (greater value for the latency parameter for higher latency and greater accuracy), in some embodiments the chunk size may be increased (larger chunk size) in order to provide greater accuracy. In alternative embodiments, the latency parameter and the chunk size may be inversely related, such that receiving a greater value for the latency parameter results in a smaller chunk size and receiving a lesser value for the latency parameter results in a larger chunk size. In some embodiments, the transcription latency is measured from the time the A/V processing service 104 sends the request to the transcription service 102 at circle "4" to the time the A/V processing service 104 receives the transcript from the transcription service 102 at circle "9."

Figure 2:
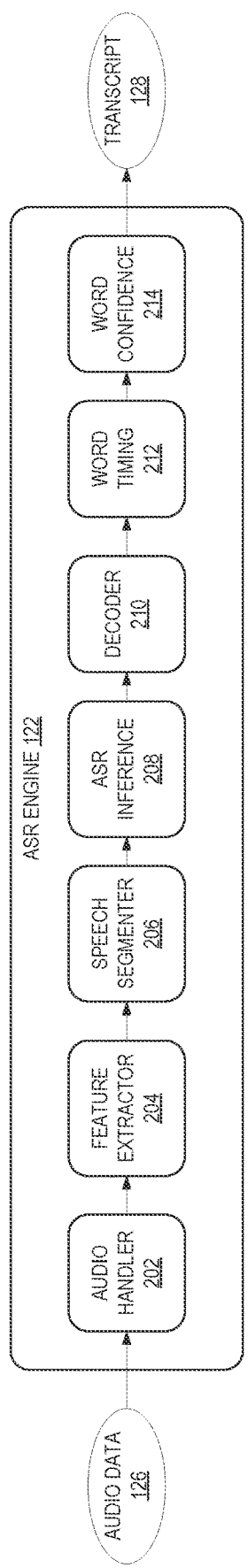
FIG. 2 is a functional block diagram illustrating an ASR engine according to some examples.

As described above, at circle "6" in FIG. 1 the transcription frontend 121 forwards the audio data 126 of the A/V data to the determined one of the ASR engines 122 (e.g., based on the language of the request). FIG. 2 illustrates details of an example ASR engine 122 according to some embodiments. In various embodiments, the ASR engine 122 may be implemented in hardware, software, or both.

The ASR engine 122 illustrated in FIG. 2 receives the audio data 126 (e.g., audio packets) as input, processes the audio data 126, and produces the transcript 128 as output. In some embodiments, an audio packet may comprise a network packet. A network packet is a basic unit of data that's grouped together and transferred over a packet-switched computer network (e.g., the internet). Each packet forms part of a complete message and carries pertinent address information that helps identify the sender and intended recipient of the message. In some embodiments, an audio packet may comprise a protocol data unit (PDU) at layer 3, the network layer, of the seven-layer OSI model of computer networking.

As shown in FIG. 2, the audio data 126 is received by an audio handler 202, which may convert the audio data 126 from one format to another, upsample/downsample the audio data 126, etc. In some embodiments, the modules of the ASR engine 122 downstream from the audio handler 202 may be configured to process data in a particular format and/or of a particular size. The audio handler 202 may thus transform the input audio data 126 into a format and/or size that can be received and processed by those downstream modules.

The output of the audio handler 202 is received by a feature extractor 204, which extracts features of the audio data 126 for further processing. Features may be numeric, and may be used for recognizing phonemes in speech represented by the audio data 126. Non-limiting examples of features include noise ratios, lengths of sounds, relative power, filter matches, etc. The audio data 126 is then received by a speech segmenter 206, which identifies boundaries between words, syllables, and/or phonemes in speech represented by the audio data 126.

The output of the audio handler 202 is received by an ASR inference component 208, which uses a machine learning model to determine posteriors of the audio data 126. An example implementation of the ASR inference component 208 is described below with reference to FIG. 3.

The output of the ASR inference component 208 is received by a decoder 210, which predicts words from the output of the ASR inference component 208. In one non-limiting example, the decoder 210 may comprise a beam search decoder that iteratively expands text hypotheses (beams) with next possible characters, and maintains only the hypotheses with the highest scores at each time step.

The output of the decoder 210 is received by a word timing component 212, which marks the start and end times of each word in the output of the decoder 210. The output of the word timing component 212 is received by a word confidence component 214, which determines a word confidence score for words of the output of the word timing component 212. The output of the word confidence component 214 is the transcript 128 with associated word confidence scores for the transcript 128. The confidence scores represent a measure of how confident the ASR engine 122 is that the output was transcribed correctly. In other words, a confidence score indicates the system's measure of probability that it has selected the word most likely to be correct out of all the words it believes a region of speech could represent. The confidence scores may have a value between 0 and 1, and may be provided at the word level and/or the utterance level in the output of the word confidence component 214. For example, confidence may be calculated for each word event, then averaged up to the utterance level.

Figure 3:
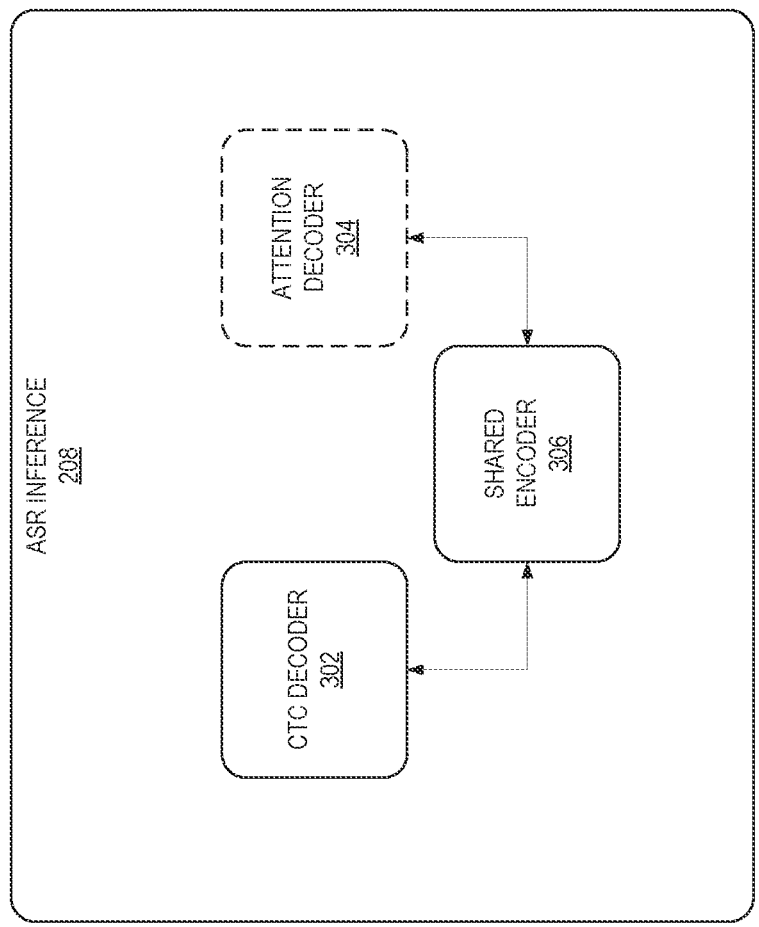
FIG. 3 is a functional block diagram illustrating an ASR inference block according to some examples.

FIG. 3 illustrates details of an example of the ASR inference component 208 according to some embodiments. The ASR inference component 208 is part of the ASR engine 122 shown in FIG. 2, which is used by the transcription service 102 of FIG. 1 to process the audio data 126 and generate the transcript of the audio data 126. As shown, the example ASR inference component 208 comprises a joint CTC-attention model including a CTC (Connectionist Temporal Classification) decoder 302, an attention decoder 304, and a shared encoder 306. In some embodiments, the shared encoder 306 is trained using inputs from both the CTC decoder 302 and the attention decoder 304 simultaneously. To perform inference, however, only the CTC decoder 302 and the shared encoder 306 are used in some embodiments.

In general, CTC uses intermediate label representation, allowing repetitions of labels and occurrences of a blank label, which represents the special emission without labels. CTC trains the model to maximize the probability distribution over all possible label sequences. CTC is generally applied on top of Recurrent Neural Networks (RNNs). Each RNN output unit is interpreted as the probability of observing the corresponding label at a particular time. The probability of a given label sequence is modeled as being conditionally independent by the product of the network outputs. The CTC loss to be minimized is defined as the negative log likelihood of the ground truth character sequence. The probability distribution can be computed efficiently using the forward-backward algorithm. The network can then be trained with standard backpropagation by taking the derivative of the loss function with respect to the softmax activation function for the intermediate label representation for any label including the blank.

Unlike the CTC approach, the attention model directly predicts each target without requiring intermediate representation or any assumptions, improving Character Error Rate (CER) as compared to CTC when no external language model is used. The model emits each label distribution at u conditioning on previous labels according to a set of recursive equations. The framework consists of two RNNs: Encoder and Attention-Decoder, so that it learns two different lengths of sequences based on the cross-entropy criterion. Encoder transforms x to a high-level representation h, then AttentionDecoder produces the probability distribution over characters $y_u$, conditioned on h and all the characters seen previously. The attention mechanism aids in the decoding procedure by integrating all the inputs based on their attention weight vectors over the input, identifying where to focus at the output step.

With reference to FIG. 3, some of the present embodiments use a CTC objective function as an auxiliary task to train the attention model encoder within the multitask learning (MTL) framework. As described above, the encoder network (of the shared encoder 306) is shared with the models of the CTC decoder 302 and the attention decoder 304. Unlike the attention model, the forward-backward algorithm of the CTC decoder 302 can enforce monotonic alignment between speech and label sequences, thus providing a framework that is more robust in acquiring appropriate alignments in noisy conditions. Another advantage of using CTC as an auxiliary task is that the network is learned quickly. For example, rather than solely depending on data-driven attention methods to estimate the desired alignments in long sequences, the forward-backward algorithm of the CTC decoder 302 helps to speed up the process of estimating the desired alignment without the aid of rough estimates of the alignment, which would require manual effort.

Figure 4:
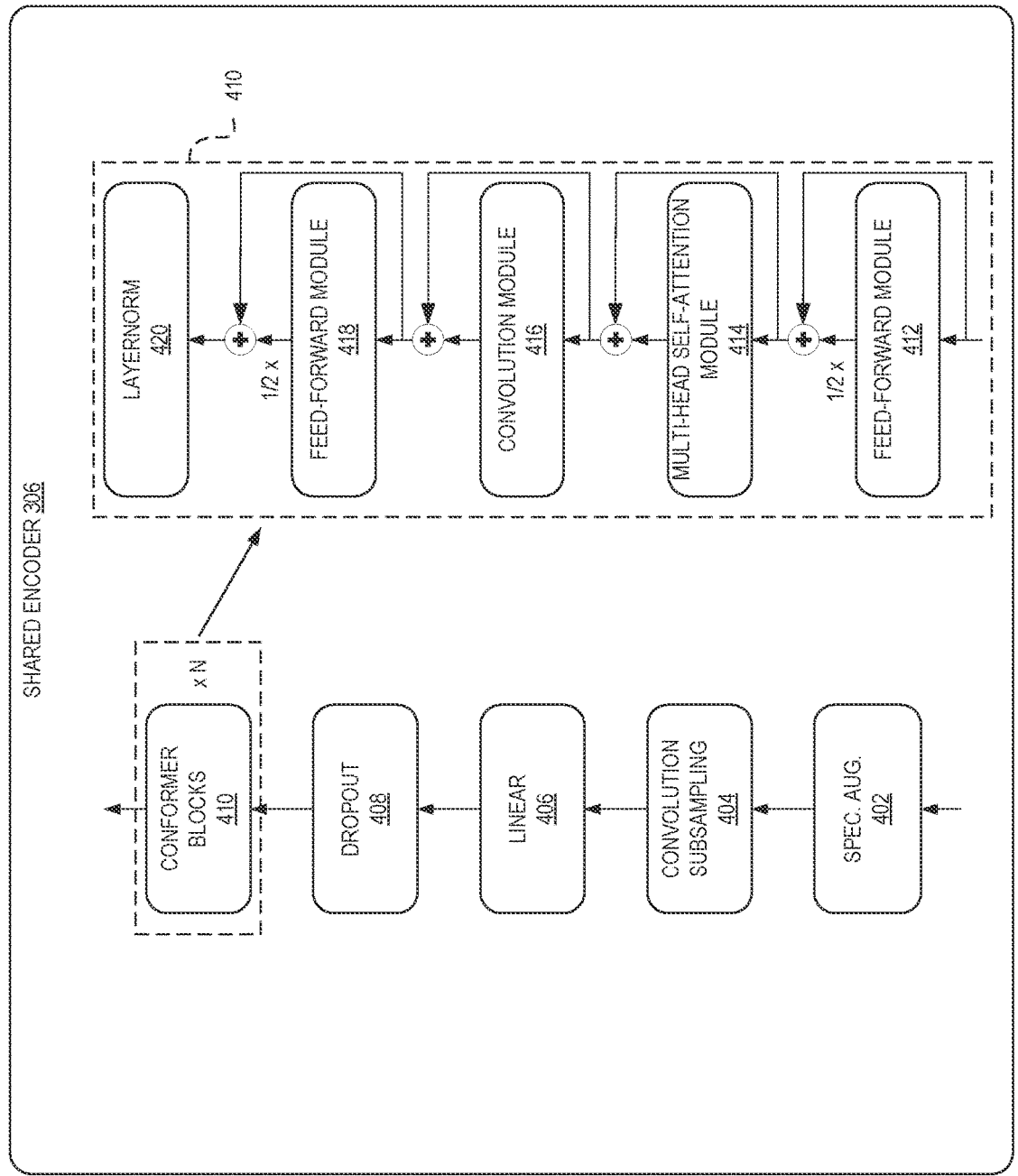
FIG. 4 is a functional block diagram illustrating a shared encoder according to some examples.

FIG. 4 illustrates details of an example of the shared encoder 306 shown in FIG. 3 according to some embodiments. As described below, the example shared encoder 306 first processes the input with a SpecAugment block 402, which is a simple data augmentation method for speech recognition. In some embodiments, SpecAugment operates on the log mel spectrogram of the input audio, rather than the raw audio itself, and may be applied directly to the feature inputs of a neural network (e.g., the filter bank coefficients). The augmentation policy may comprise warping the features, masking blocks of frequency channels, and/or masking blocks of time steps.

With further reference to FIG. 4, the output of the SpecAugment block 402 is received by a convolution subsampling layer 404, which extract features from, and reduces the dimensions of, the input. The output of the convolution subsampling layer 404 is received by a linear transformation block 406, and the output of the linear transformation block 406 is received by a dropout block 408. Generally, dropout is a regularization technique for reducing overfitting in neural networks by preventing complex co-adaptations on training data. In particular, dropout refers to randomly dropping out, or omitting, units (both hidden and visible) during the training process of a neural network.

With further reference to FIG. 4, the output of the dropout block 408 is received by a number (N) of conformer blocks 410. A conformer block 410 comprises four modules stacked together: a first feed-forward module 412, a multi-headed self-attention (MHSA) module 414, a convolution module 416, and a second feed-forward module 418, as illustrated at the right-hand side of FIG. 4.

In some embodiments, the MHSA module 414 integrates a technique from Transformer-XL: the relative sinusoidal positional encoding scheme. The relative positional encoding allows the MHSA module 414 to generalize better on different input lengths, and the resulting encoder 306 is more robust to the variance of the utterance length. Some embodiments may use prenorm residual units with dropout, which helps with training and regularizing deeper models.

In some embodiments, the first feed-forward module 412 follows pre-norm residual units (not shown) and applies layer normalization within the residual unit and on the input before the first linear layer. The first feed-forward module 412 may also apply Swish activation and dropout, which helps regularize the network.

As shown at the right-hand side of FIG. 4, the conformer block 410 contains two feed-forward modules 412, 418 sandwiching the MHSA module 414 and the convolution module 416. In some embodiments, half-step residual weights may be employed in the feed-forward modules 412, 418. The second feed-forward module 418 is followed by a layer normalization layer 420. Generally, layer normalization directly estimates the normalization statistics from the summed inputs to the neurons within a hidden layer so the normalization does not introduce any new dependencies between training cases.

For unified models to perform well, it is advantageous that they be exposed to both limited and full contexts during their training. For example, the present embodiments provide a tunable latency parameter, and the value of the latency parameter influences the chunk size. To train models that are adapted for a range of different chunk sizes, some embodiments use dynamic chunk training (DCT) for self-attention layers. The DCT idea involves varying the chunk size dynamically up to the maximum utterance length for different batches in training. In some embodiments, for example, random sampling may occur for chunk sizes between 8 (=320 ms) and 32 (=1280 ms) frames and a left-context size between 0 and all left chunks, so that the model becomes robust to numerous sizes at inference time. This may be achieved, in some embodiments, by applying a dynamic chunk mask to the attention score matrix for each self-attention layer, which is illustrated in Eq. 1:

$$\text{Attn}(Q,K,V) = \text{Softmax}(\text{Mask}(QK^T)/\sqrt{d})V \qquad (1)$$

where Q, K, V, and d denote the queries, keys, values, and embedding dimension, respectively. In some embodiments, the chunk mask strictly enforces the look-ahead size by setting the chunk size, while the receptive field with window masking grows linearly with the stacking of more layers. In some embodiments, a chunk size between 8 (=320 ms) and 32 (=1280 ms) self-attention frames may be randomly sampled, and the left context size may be dynamically varied via chunk masking, so that the model becomes robust to numerous left-context sizes at inference time.

Figure 5:
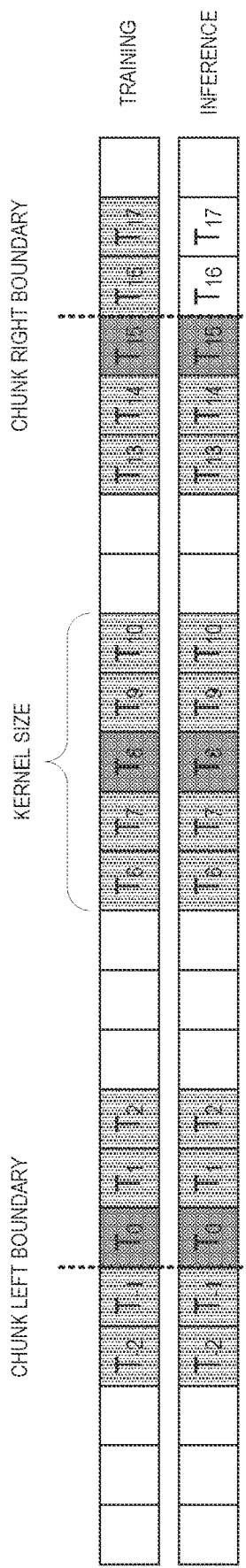
FIG. 5 is a block diagram illustrating training of, and inference using, a shared encoder according to some examples.
Figure 5:
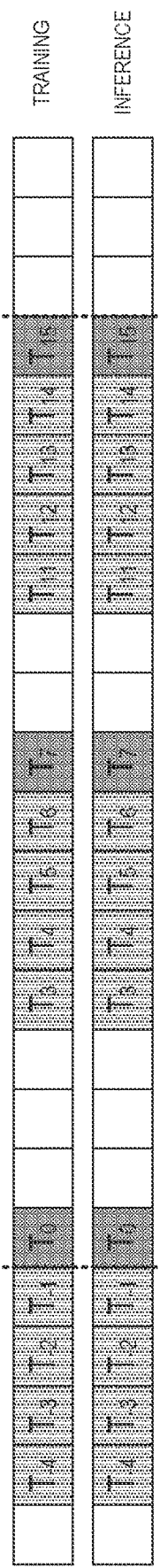
Figure 5:
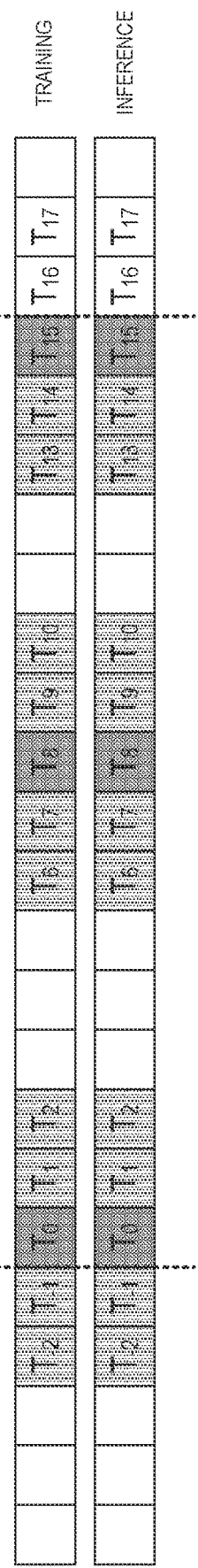

FIGS. 5A-5C illustrate three example convolution operators, where FIG. 5C illustrates operation of the convolution module 416 of the shared encoder 306 of FIG. 4. Generally, the convolution operator is a key component of conformer ASR models, as it better models the short-range dependencies of neighboring feature frames, while the self-attention better models long-range interactions. However, the conventional convolution in conformers results in significant accuracy degradation due to the mode mismatch between training and inference, as shown in FIG. 5A. Indeed, the chunk's rightmost frames can see context from the next chunk on their right during training, whereas at inference this right chunk context is not available, causing a discrepancy. This inter-chunk correlation is even more magnified when stacking more conformer blocks.

One solution uses a causal convolution, as shown in FIG. 5B. The left-shifted convolution kernel restricts its span from having access to any frames beyond the chunk's right boundary. This still leads to performance degradation though, as the lack of within-chunk future context for the frame being processed results in a poorer acoustic representation.

To solve these problems, some of the present embodiments use a non-causal dynamic chunk convolution (DC-Conv), as shown in FIG. 5C. As opposed to conventional convolution (FIG. 5A), the chunk convolution operator of FIG. 5C has no access to any future context beyond its right boundary. This technique advantageously allows training to more closely match the streaming inference setting where no future context beyond the right chunk boundary is available either. As opposed to causal convolution (FIG. 5B), the DCConv chunk in FIG. 5C has access to a limited within-chunk future context of the current frame. This extra within-chunk future context results in more accurate acoustic modeling and therefore higher overall accuracy.

$$X_C^i = X_{[iC-L:(i+1)C]} = [X_{[iC-L:iC]}, X_{[iC:(i+1)C]}] \quad (2)$$

$$X_C^{i'} = Conv(X_C^i) \quad (3)$$

$$X' = Concat(X_{C[L:]}^{i'}) \quad (4)$$

As shown in Eq. 2-4, the DCConv is implemented in some embodiments by splitting the input sequence X into chunks $X_C^i$, where i denotes the index of the chunk within the sequence and C denotes the chunk size. Each chunk has a left context size L=(kernel size−1)/2. After the convolution is applied on every chunk, $X_C^i$ is concatenated, where the first L output frames that correspond to the input left context have been removed from $X_C^i$. This DCConv operator advantageously does not slow down the training, since all the chunks are independent of one another. Furthermore, the sizes of both the chunk mask for the self-attention layers and for the DCConv are synchronized at each training step such that the overall look-ahead size of the encoder is strictly set to the specified common size.

In some embodiments, fine-tuning from a baseline full-contextual model results in higher overall performance. Instead of training a unified model from scratch, the weights may be initialized in some embodiments from a pretrained full-contextual model. This approach advantageously allows leveraging of the non-streaming performance of the full-contextual model. Simultaneously, the model performs better in the streaming mode, as it can transfer common speech recognition knowledge gained from the non-streaming pre-training.

Figure 6:
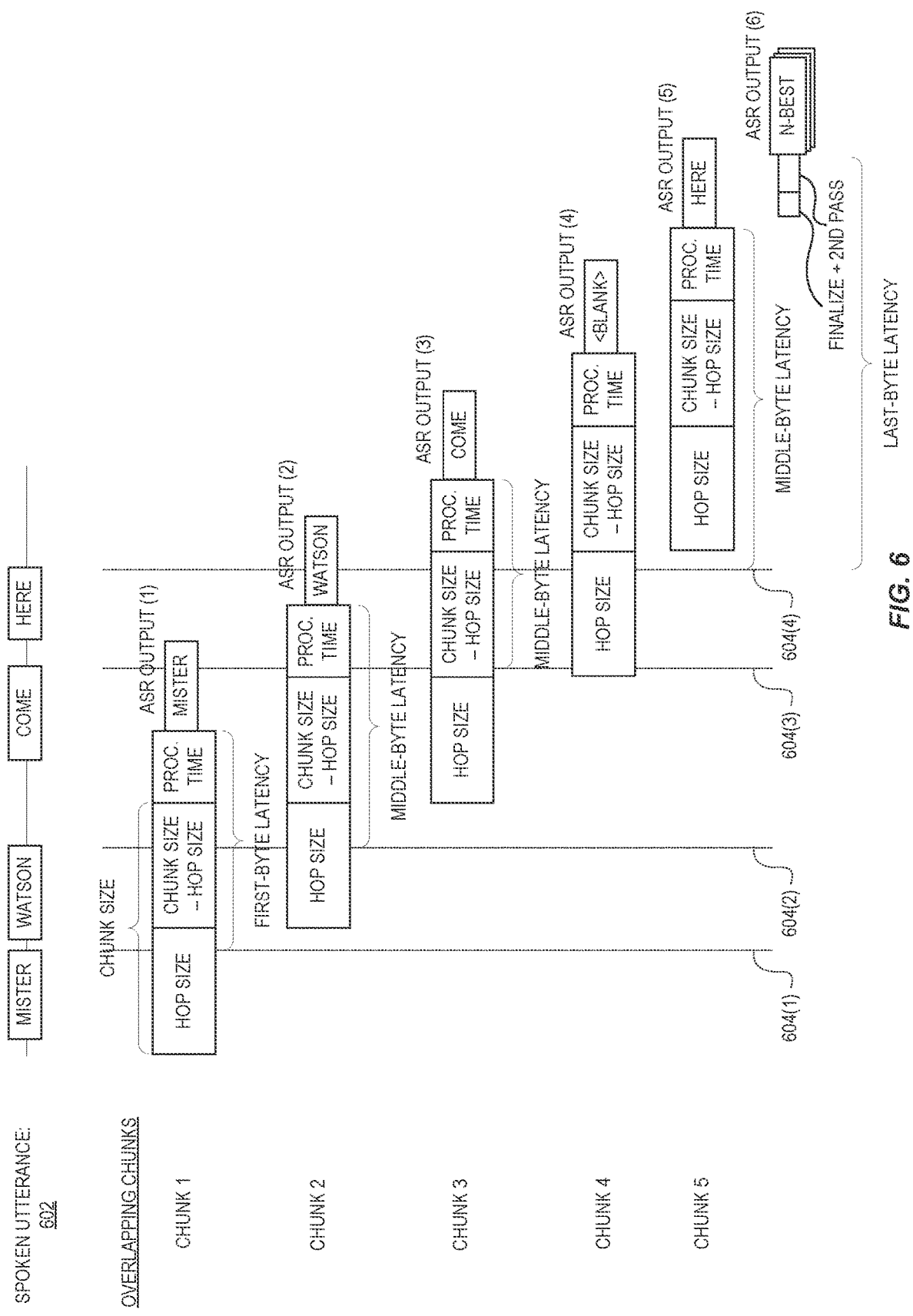
FIG. 6 is a block diagram illustrating ASR latency estimation according to some examples.

FIG. 6 illustrates a chunk-hopping mechanism, according to some embodiments, that enables the self-attention model described herein to support online recognition by encoding on segmented frame chunks sequentially. The example spoken utterance 602 in FIG. 6 includes four words: Mister Watson, come here. The entire utterance 602 is segmented into several overlapping chunks, labeled chunks 1-5. Each chunk contains three parts, one of which is the current part, whose output is used as the output of the chunk. The other two parts are the past part, and the future part, which provide contexts for the calculation of the current part. After calculating one chunk, a hopping is generated for the recognition of the next chunk, and the hop size is equal to the size of the current part in each chunk. In the illustrated embodiment, and as discussed above, the hop size is 50%. In alternative embodiments, however, the hop size may be set to any desired value. While the illustrated embodiment includes overlapping chunks, in some embodiments the chunks may not overlap. Processing without chunk overlap may advantageously reduce latency.

The vertical lines in FIG. 6 indicate the timestamps 604 for the end of each spoken word. As described above, the latency is influenced by the chunk size, which is indicated in FIG. 6 as the combination of the box labeled HOP SIZE and the box labeled CHUNK SIZE—HOP SIZE, such that these two boxes together represent a chunk. In some embodiments, the first-byte latency is measured from the timestamp 604(1) at the end of the first spoken word (Mister) to the timestamp of ASR OUTPUT (1), which is the output of the ASR engine 122 for the first spoken word. Similarly, the middle-byte latency is measured from the timestamp 604(2), 604(3), 604(4) at the end of each subsequent word (after the first spoken word) to the timestamp of the output ASR OUTPUT (2)-ASR OUTPUT (5) of the ASR engine 122 for that spoken word. The values of the first-byte latency and the middle-byte latencies are influenced by the chunk size, as well as by the processing time for each chunk. As the chunk size increases, the latency also increases, but so does the transcription accuracy. As described above, the chunk size is influenced by the tunable latency parameter. As the latency parameter is adjusted downward, in some embodiments the chunk size may be decreased in order to provide lower latency (but less accuracy). Similarly, as the latency parameter is adjusted upward, in some embodiments the chunk size may be increased in order to provide greater accuracy (but higher latency). In some embodiments, the last-byte latency is measured from the timestamp 604(4) at the end of the last spoken word (here) to the timestamp of the output ASR OUTPUT (6) of the ASR engine 122 for the N-BEST predictions for all spoken words. Sometimes, the output of the ASR engine 122 may be blank, as indicated by ASR OUTPUT (4). For example, the output of the ASR engine 122 may be blank when a given chunk contains no detected speech, or when a confidence score associated with a word output by the ASR engine 122 is below a threshold value.

Figure 7:
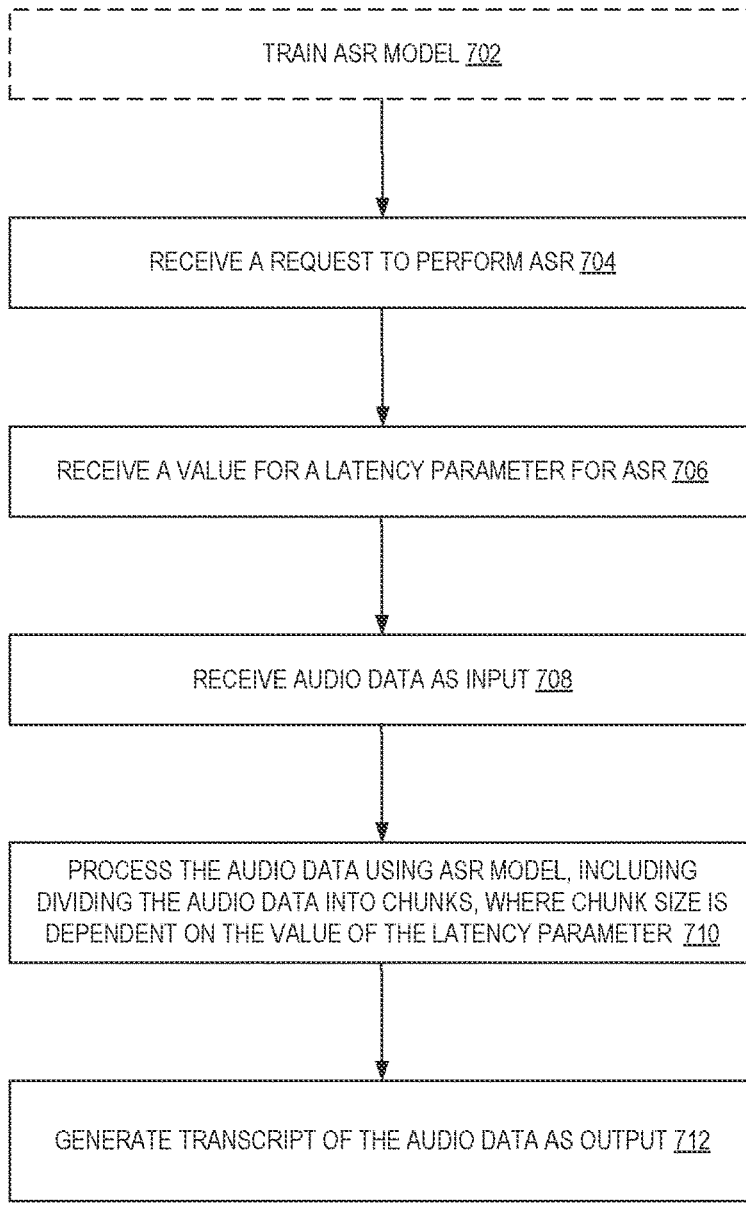
FIG. 7 is a flow diagram illustrating operations of a method for customizable latency for ASR according to some examples.

FIG. 7 is a flow diagram illustrating operations 700 of a method for customizable latency for ASR according to some examples. Some or all of the operations 700 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 700 are performed by the transcription service 102 of the other figures.

The operations 700 include, at block 702, training an ASR model. For example, this block may include the unified model training described above with reference to Eq. 1, as well as the process for fine-tuning from a baseline full-contextual model described above.

The operations 700 further include, at block 704, receiving a request to perform ASR. For example, this block may include either or both of the computing device 106 transmitting the request to the A/V service 102 to begin processing of A/V data, as described above with reference to circle "1" in FIG. 1, or the A/V processing service 104 sending a request to the A/V transcription service 102 to generate a transcript for A/V data, as described above with reference to circle "4" in FIG. 1.

The operations 700 further include, at block 706, receiving a value for a latency parameter for ASR. For example, this block may include either or both of the computing device 106 sending the value for the latency parameter to the A/V service 102, as described above with reference to circle "1" in FIG. 1, or the A/V processing service 104 sending the value for the latency parameter to the A/V transcription service 102, as described above with reference to circle "4" in FIG. 1. While FIG. 6 illustrates blocks 704 and 706 separately, in some embodiments the latency parameter may be included in the request, as described above.

The operations 700 further include, at block 708, receiving audio data 126. For example, this block may include any one, or any combination of two or more of, the A/V processing service 104 receiving the A/V data from the A/V source device 110 or the A/V datastore 112, as described above with reference to circle "3" in FIG. 1, or the transcription service 102 receiving the A/V data from the A/V processing service 104, as described above with reference to circle "4" in FIG. 1, or the determined one of the ASR engines 122 receiving the audio data 126 of the A/V data from the transcription frontend 121, as described above with reference to circle "6" in FIG. 1.

The operations 700 further include, at block 710, processing the audio data 126 using the ASR model, including dividing the audio data 126 into chunks, where chunk size is dependent on the value of the latency parameter. For example, this block may include the ASR engine 122 processing the audio data 126, as described above with reference to circle "7" in FIG. 1, as well as one or more of the aspects described above with reference to FIGS. 2-6.

The operations 700 further include, at block 712, generating a transcript of the audio data 126 as output. For example, this block may include the ASR engine 122 generating the transcript of the audio data 126 and sending the transcript of the audio data 126 to the transcription frontend 121, as described above with reference to circles "7" and "8" in FIG. 1, as well as one or more of the aspects described above with reference to circle "9" through circle "13" in FIG. 1.

Figure 8:
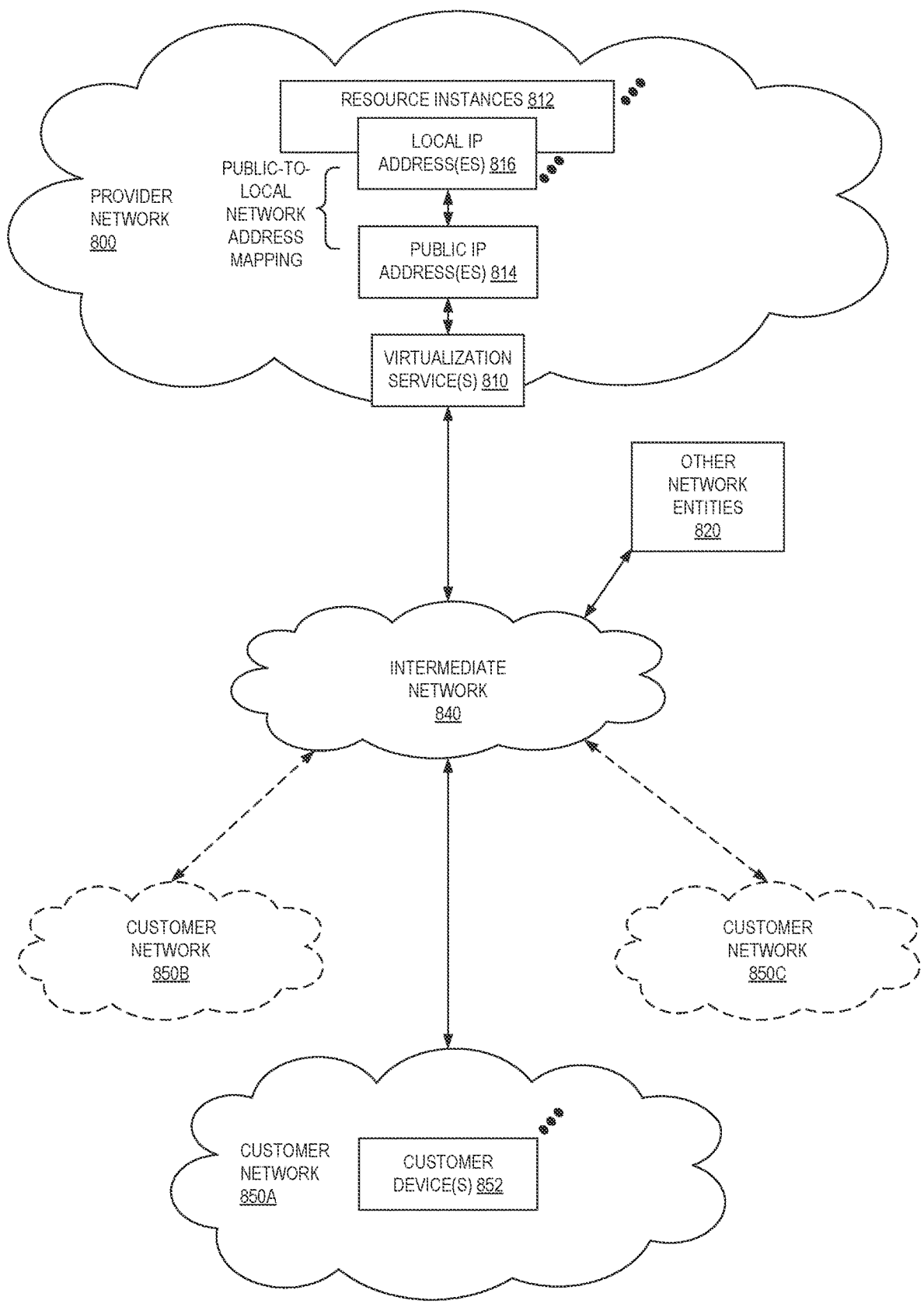
FIG. 8 is a functional block diagram illustrating an example provider network environment according to some examples.

FIG. 8 illustrates an example provider network (or "service provider system") environment according to some examples. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some examples, the provider network 800 can also provide public IP addresses 814 and/or public IP address ranges (e.g., Internet Protocol version 4 (IPv4) or Internet Protocol version 6 (IPv6) addresses) that customers can obtain from the provider network 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
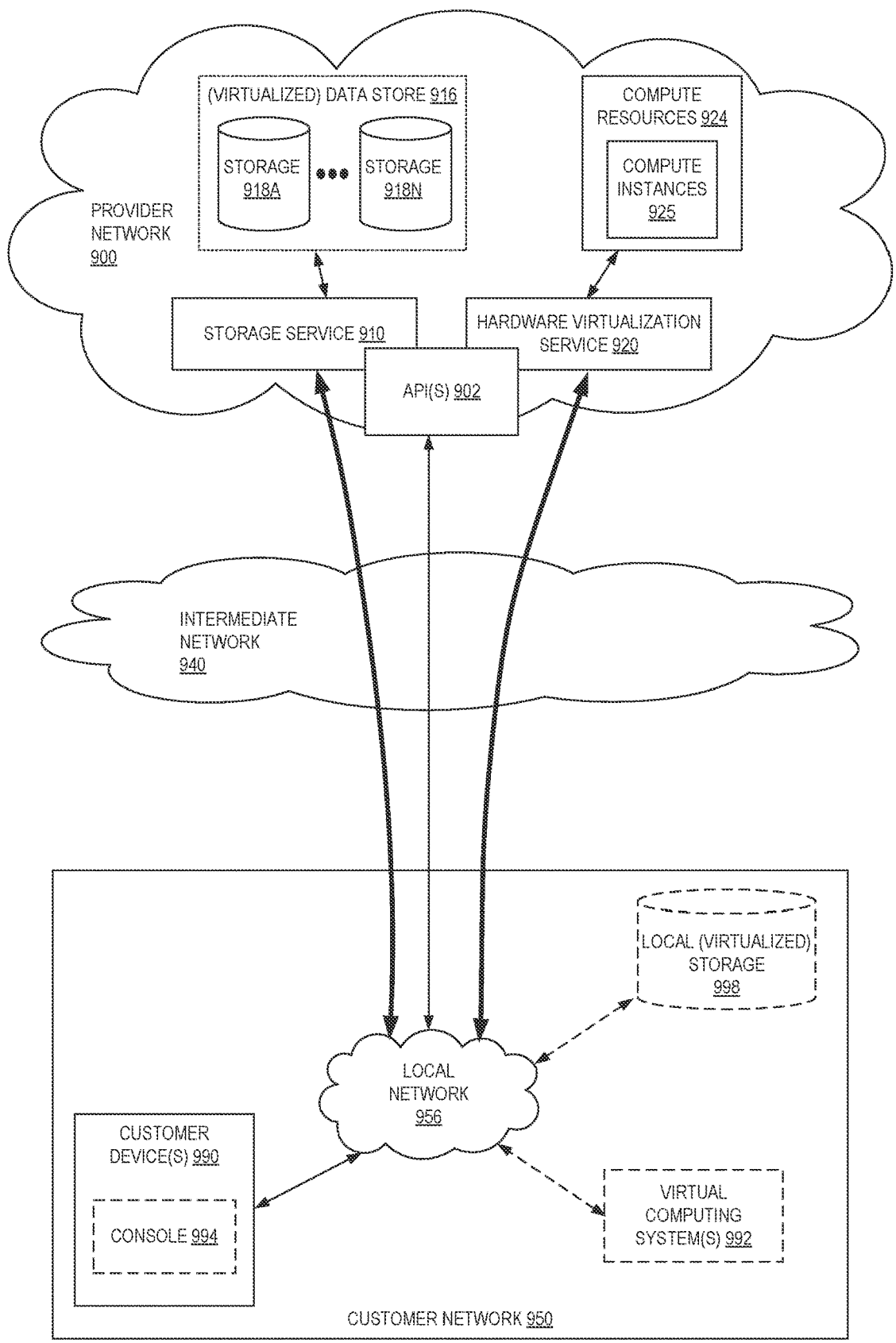
FIG. 9 is a functional block diagram illustrating an example provider network that provides a storage service and a hardware virtualization service to customers according to some examples.

FIG. 9 is a block diagram of an example provider network environment that provides a storage service and a hardware virtualization service to customers, according to some examples. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some examples, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some examples, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some examples, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some examples, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Illustrative Systems

Figure 10:
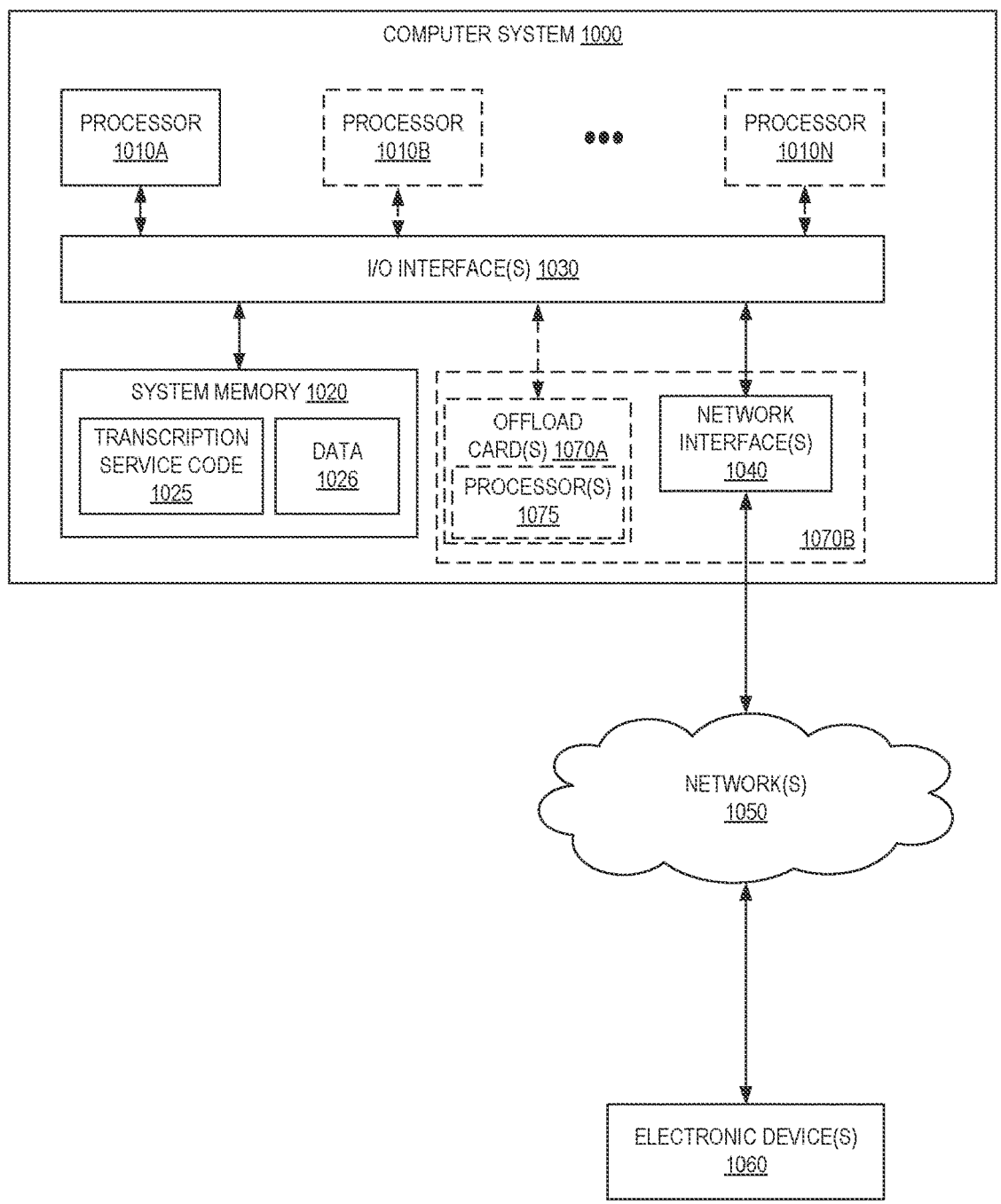
FIG. 10 is a functional block diagram illustrating an example computer system that can be used in some examples.

In some examples, a system that implements a portion or all of the techniques described herein can include a general-purpose computer system, such as the computer system 1000 illustrated in FIG. 10, that includes, or is configured to access, one or more computer-accessible media. In the illustrated example, the computer system 1000 includes one or more processors 1010 coupled to a system memory 1020 via an input/output (I/O) interface 1030. The computer system 1000 further includes a network interface 1040 coupled to the I/O interface 1030. While FIG. 10 shows the computer system 1000 as a single computing device, in various examples the computer system 1000 can include one computing device or any number of computing devices configured to work together as a single computer system 1000.

In various examples, the computer system 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various examples, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various examples, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1020 as transcription service code 1025 (e.g., executable to implement, in whole or in part, the transcription service 102) and data 1026.

In some examples, the I/O interface 1030 can be configured to coordinate I/O traffic between the processor 1010, the system memory 1020, and any peripheral devices in the device, including the network interface 1040 and/or other peripheral interfaces (not shown). In some examples, the I/O interface 1030 can perform any necessary protocol, timing, or other data transformations to convert data signals from one component (e.g., the system memory 1020) into a format suitable for use by another component (e.g., the processor 1010). In some examples, the I/O interface 1030 can include support for devices attached through various types of peripheral buses, such as a variant of the Peripheral Component Interconnect (PCI) bus standard or the Universal Serial Bus (USB) standard, for example. In some examples, the function of the I/O interface 1030 can be split into two or more separate components, such as a north bridge and a south bridge, for example. Also, in some examples, some or all of the functionality of the I/O interface 1030, such as an interface to the system memory 1020, can be incorporated directly into the processor 1010.

The network interface 1040 can be configured to allow data to be exchanged between the computer system 1000 and other devices 1060 attached to a network or networks 1050, such as other computer systems or devices as illustrated in FIG. 1, for example. In various examples, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect—Express (PCI-E) standard, or another interconnect such as a QuickPath interconnect (QPI) or UltraPath interconnect (UPI)). For example, in some examples the computer system 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some examples the offload card(s) 1070A or 1070B can perform compute instance management operations, such as pausing and/or un-pausing compute instances, launching and/or terminating compute instances, performing memory transfer/copying operations, etc. These management operations can, in some examples, be performed by the offload card(s) 1070A or 1070B in coordination with a hypervisor (e.g., upon a request from a hypervisor) that is executed by the other processors 1010A-1010N of the computer system 1000. However, in some examples the virtualization manager implemented by the offload card(s) 1070A or 1070B can accommodate requests from other entities (e.g., from compute instances themselves), and can not coordinate with (or service) any separate hypervisor.

In some examples, the system memory 1020 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 918A-918N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
    training an automatic speech recognition (ASR) model using dynamic chunk training (DCT) for self-attention layers by varying a chunk size dynamically for different batches during the training;
    receiving, at a transcription service implemented in a provider network from a computing device outside the provider network, a request to perform ASR, wherein the request includes a value for a latency parameter for ASR;
    processing, by an ASR engine of the transcription service, an input of audio data using the ASR model, including dividing the audio data into chunks to generate chunked audio data, wherein a chunk size of the chunked audio data is dependent on the value of the latency parameter; and generating as output, by the ASR engine, a transcript from the chunked audio data.

2. The computer-implemented method of claim 1, wherein:
the latency parameter and the chunk size are directly related, such that receiving a greater value for the latency parameter results in a larger chunk size and receiving a lesser value for the latency parameter results in a smaller chunk size; or
the latency parameter and the chunk size are inversely related, such that receiving a greater value for the latency parameter results in a smaller chunk size and receiving a lesser value for the latency parameter results in a larger chunk size.

3. A computer-implemented method comprising:
receiving, at a transcription service implemented in a provider network from a computing device outside the provider network, a request to perform automatic speech recognition (ASR), wherein the request includes a value for a latency parameter for ASR;
processing, by an ASR engine of the transcription service, an input of audio data using an ASR model, including dividing the audio data into chunks to generate chunked audio data, wherein a chunk size of the chunked audio data is dependent on the value of the latency parameter; and
generating as output, by the ASR engine, a transcript from the chunked audio data.

4. The computer-implemented method of claim 3, wherein:
the latency parameter and the chunk size are directly related, such that receiving a greater value for the latency parameter results in a larger chunk size and receiving a lesser value for the latency parameter results in a smaller chunk size; or
the latency parameter and the chunk size are inversely related, such that receiving a greater value for the latency parameter results in a smaller chunk size and receiving a lesser value for the latency parameter results in a larger chunk size.

5. The computer-implemented method of claim 3, wherein the ASR engine comprises a joint CTC (Connectionist Temporal Classification)-attention model.

6. The computer-implemented method of claim 5, wherein the joint CTC-attention model includes a CTC decoder, an attention decoder, and a shared encoder.

7. The computer-implemented method of claim 6, wherein the shared encoder is trained using inputs from both the CTC decoder and the attention decoder simultaneously.

8. The computer-implemented method of claim 7, wherein the ASR engine uses the CTC decoder and the shared encoder to perform inference, but does not use the attention decoder to perform inference.

9. The computer-implemented method of claim 3, wherein to perform inference an encoder of the ASR engine uses non-causal dynamic chunk convolution (DCConv) in which a chunk convolution operator has no access to any future context beyond its right boundary.

10. The computer-implemented method of claim 9, wherein the DCConv has access to a limited within-chunk future context of a current frame.

11. The computer-implemented method of claim 3, wherein the ASR model was trained using dynamic chunk training (DCT) for self-attention layers by varying a training chunk size dynamically for different batches during the training.

12. The computer-implemented method of claim 11, wherein the training chunk size varies dynamically up to a maximum utterance length.

13. The computer-implemented method of claim 12, wherein varying the chunk size dynamically for different batches during the training comprises applying a dynamic chunk mask to an attention score matrix for the self-attention layers.

14. A system comprising:
a data store storing computer-executable instructions; and
one or more electronic devices configured to execute the computer-executable instructions to implement a transcription service in a provider network, the transcription service including instructions that upon execution by one or more processors cause the transcription service to:
receive, from a computing device outside the provider network, a request to perform automatic speech recognition (ASR), wherein the request includes a value for a latency parameter for ASR;
process, by an ASR engine of the transcription service, an input of audio data using an ASR model, including dividing the audio data into chunks to generate chunked audio data, wherein a chunk size of the chunked audio data is dependent on the value of the latency parameter; and
generate as output, by the ASR engine, a transcript from the chunked audio data.

15. The system of claim 14, wherein:
the latency parameter and the chunk size are directly related, such that receiving a greater value for the latency parameter results in a larger chunk size and receiving a lesser value for the latency parameter results in a smaller chunk size; or
the latency parameter and the chunk size are inversely related, such that receiving a greater value for the latency parameter results in a smaller chunk size and receiving a lesser value for the latency parameter results in a larger chunk size.

16. The system of claim 14, wherein the ASR engine comprises a joint CTC (Connectionist Temporal Classification)-attention model.

17. The system of claim 16, wherein the joint CTC-attention model includes a CTC decoder, an attention decoder, and a shared encoder.

18. The system of claim 17, wherein the shared encoder is trained using inputs from both the CTC decoder and the attention decoder simultaneously.

19. The system of claim 18, wherein the ASR engine uses the CTC decoder and the shared encoder to perform inference, but does not use the attention decoder to perform inference.

20. The system of claim 14, wherein to perform inference an encoder of the ASR engine uses non-causal dynamic chunk convolution (DCConv) in which a chunk convolution operator has no access to any future context beyond its right boundary.

* * * * *